(12) United States Patent
Hu et al.

(10) Patent No.: US 10,616,270 B2
(45) Date of Patent: Apr. 7, 2020

(54) OPTIMIZATION APPARATUS, OPTIMIZATION METHOD, AND OPTIMIZATION PROGRAM

(71) Applicant: NIPPON TELEGRAPH AND TELEPHONE CORPORATION, Chiyoda-ku (JP)

(72) Inventors: Bo Hu, Musashino (JP); Toshiharu Kishi, Musashino (JP); Hideo Kitazume, Musashino (JP); Takaaki Koyama, Musashino (JP); Yukio Nagafuchi, Musashino (JP); Yasuhiro Teramoto, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 251 days.

(21) Appl. No.: 15/522,196

(22) PCT Filed: Nov. 5, 2015

(86) PCT No.: PCT/JP2015/081233
§ 371 (c)(1),
(2) Date: Apr. 26, 2017

(87) PCT Pub. No.: WO2016/076207
PCT Pub. Date: May 19, 2016

(65) Prior Publication Data
US 2017/0339183 A1  Nov. 23, 2017

(30) Foreign Application Priority Data
Nov. 10, 2014 (JP) .................. 2014-228053

(51) Int. Cl.
*H04L 29/06* (2006.01)
*G06F 13/00* (2006.01)

(52) U.S. Cl.
CPC .......... *H04L 63/1458* (2013.01); *G06F 13/00* (2013.01); *H04L 63/1416* (2013.01); *H04L 63/302* (2013.01); *H04L 2463/141* (2013.01)

(58) Field of Classification Search
CPC ............. H04L 63/1458; H04L 63/1416; H04L 63/302; H04L 2463/141; G06F 13/00
See application file for complete search history.

(56) References Cited

U.S. PATENT DOCUMENTS 7,065,789 B1 * 6/2006 Neyman ............... H04L 63/145
                                                                   713/188
7,836,502 B1 * 11/2010 Zhao ................... G06F 21/6218
                                                                   726/22

(Continued)

FOREIGN PATENT DOCUMENTS

JP       2004-86880 A     3/2004
JP       2004-302956 A    10/2004

(Continued)

OTHER PUBLICATIONS

International Search Report dated Jan. 26, 2016 in PCT/JP2015/081233 filed Nov. 5, 2015.

(Continued)

*Primary Examiner* — Sarah Su
(74) *Attorney, Agent, or Firm* — Oblon, McClelland, Maier & Neustadt, L.L.P.

(57) ABSTRACT

An optimization apparatus collects cyber attack information that is information related to a cyber attack, and system information that is information related to an entire system including a device that has received the cyber attack. Based on the collected cyber attack information and system information, the optimization apparatus identifies an attack route of the cyber attack, and extracts, as dealing point candidates, devices that are on the attack route and have an effective dealing function against the cyber attack. Subsequently, the (Continued)

optimization apparatus selects a dealing point from the extracted dealing point candidates by using optimization logic that has been set.

9 Claims, 10 Drawing Sheets

(56) References Cited

U.S. PATENT DOCUMENTS

| | | | | |
|---|---|---|---|---|
| 8,782,793 | B2* | 7/2014 | Zaitsev | G06F 21/56 |
| | | | | 713/187 |
| 9,332,029 | B1* | 5/2016 | Tikhonov | H04L 63/145 |
| 9,398,037 | B1* | 7/2016 | Roskind | G06F 8/65 |
| 2002/0032717 | A1 | 3/2002 | Malan et al. | |
| 2002/0032793 | A1 | 3/2002 | Malan et al. | |
| 2002/0035698 | A1 | 3/2002 | Malan et al. | |
| 2003/0172289 | A1 | 9/2003 | Soppera | |
| 2004/0088564 | A1* | 5/2004 | Norman | G06F 21/566 |
| | | | | 726/24 |
| 2004/0193892 | A1 | 9/2004 | Tamura et al. | |
| 2008/0172478 | A1* | 7/2008 | Kiyohara | H04L 45/02 |
| | | | | 709/220 |
| 2014/0289853 | A1* | 9/2014 | Teddy | H04L 63/1416 |
| | | | | 726/23 |
| 2015/0066538 | A1* | 3/2015 | Dantsker | G06F 19/3418 |
| | | | | 705/3 |

FOREIGN PATENT DOCUMENTS

| | | |
|---|---|---|
| JP | 2006-50442 A | 2/2006 |
| JP | 2006-350561 A | 12/2006 |
| JP | 2012-195847 A | 10/2012 |

OTHER PUBLICATIONS

Eric Y. Chen, "AEGIS: An Active-Network-Powered Defense Mechanism against DDoS Attacks" IWAN '01 Proceedings of the IFIP-TC6 Third International Working Conference on Active Networks, 2001, pp. 1-15.

W. Keith Edwards, et al., "Security Automation Considered Harmful?" NSPW '07 Proceedings of the 2007 Workshop on New Security Paradigms, Sep. 2007, pp. 33-42.

Extended European Search Report dated Apr. 12, 2018 in corresponding European Patent Application No. 15858610.7, 9 pages.

* cited by examiner

| TYPE OF ATTACK | ATTACKER IP ADDRESS | VICTIM IP ADDRESS | EFFECTIVE DEALING FUNCTION |
|---|---|---|---|
| DoS | A.A.A.A | B.B.B.B | LAYER 4 BLOCKAGE |
| | | | |
| | | | |

| DEALING POINT | DEALING FUNCTION | RESOURCE USAGE STATUS INFORMATION |
|---|---|---|
| FW | LAYER 4 BLOCKAGE | CPU USAGE RATE: 10% |
| | | |
| | | |

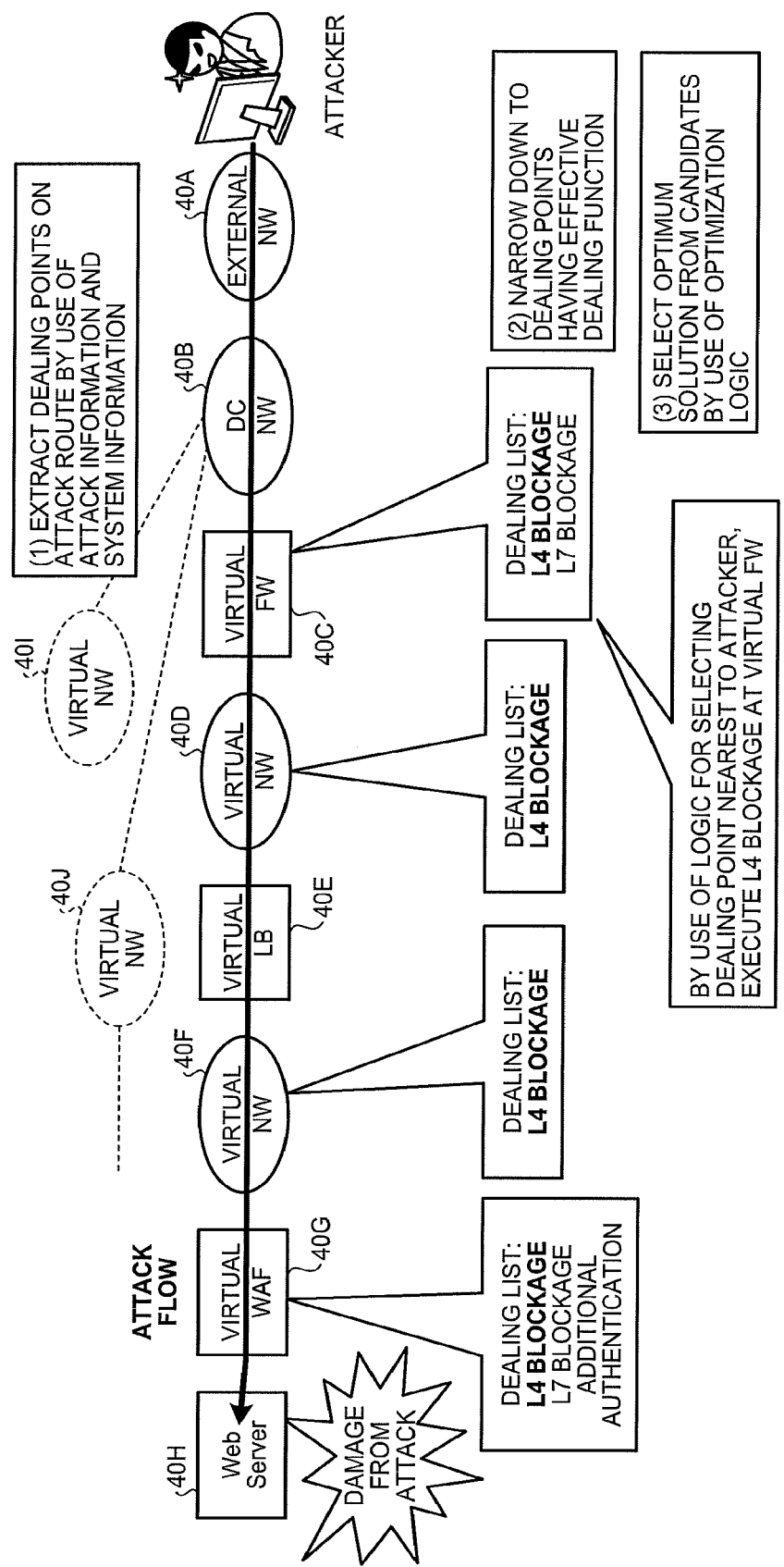

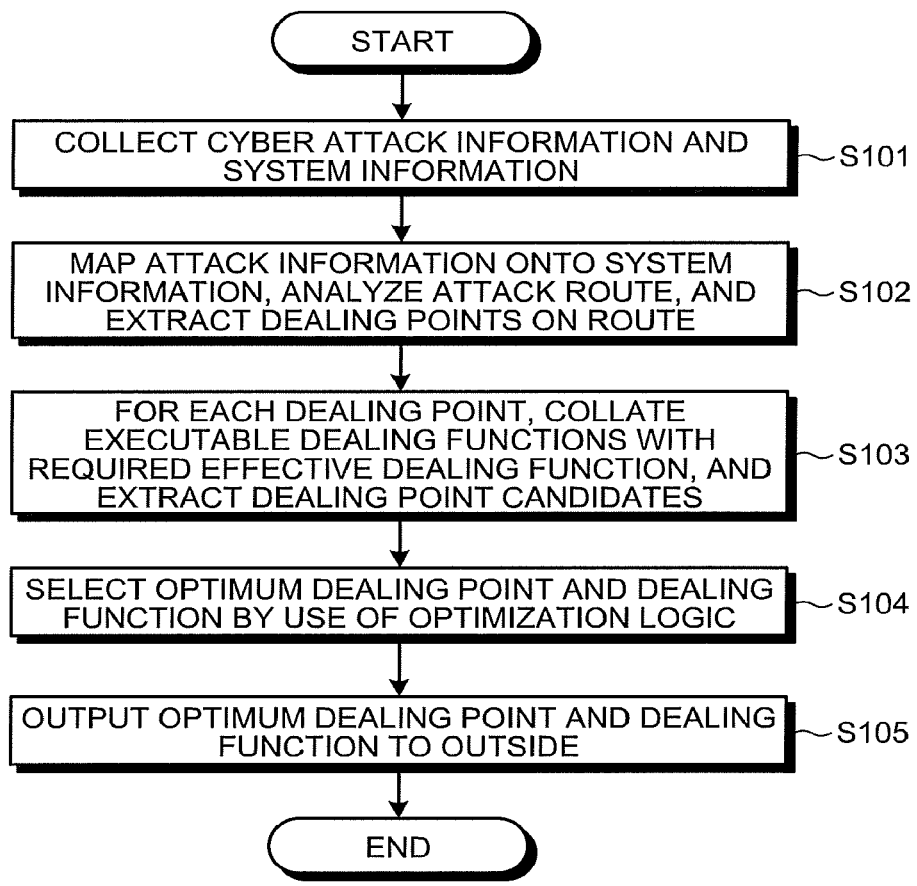

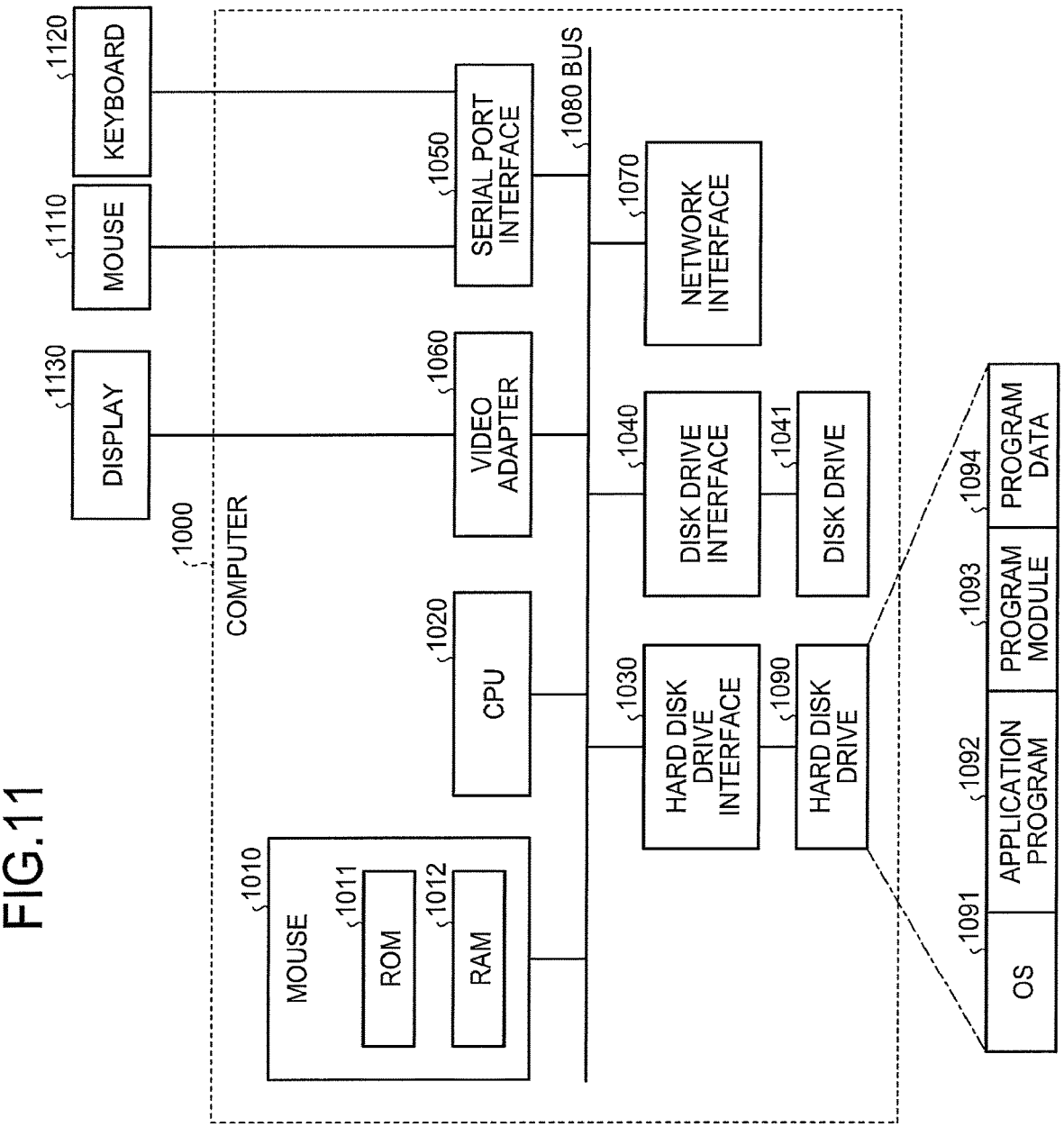

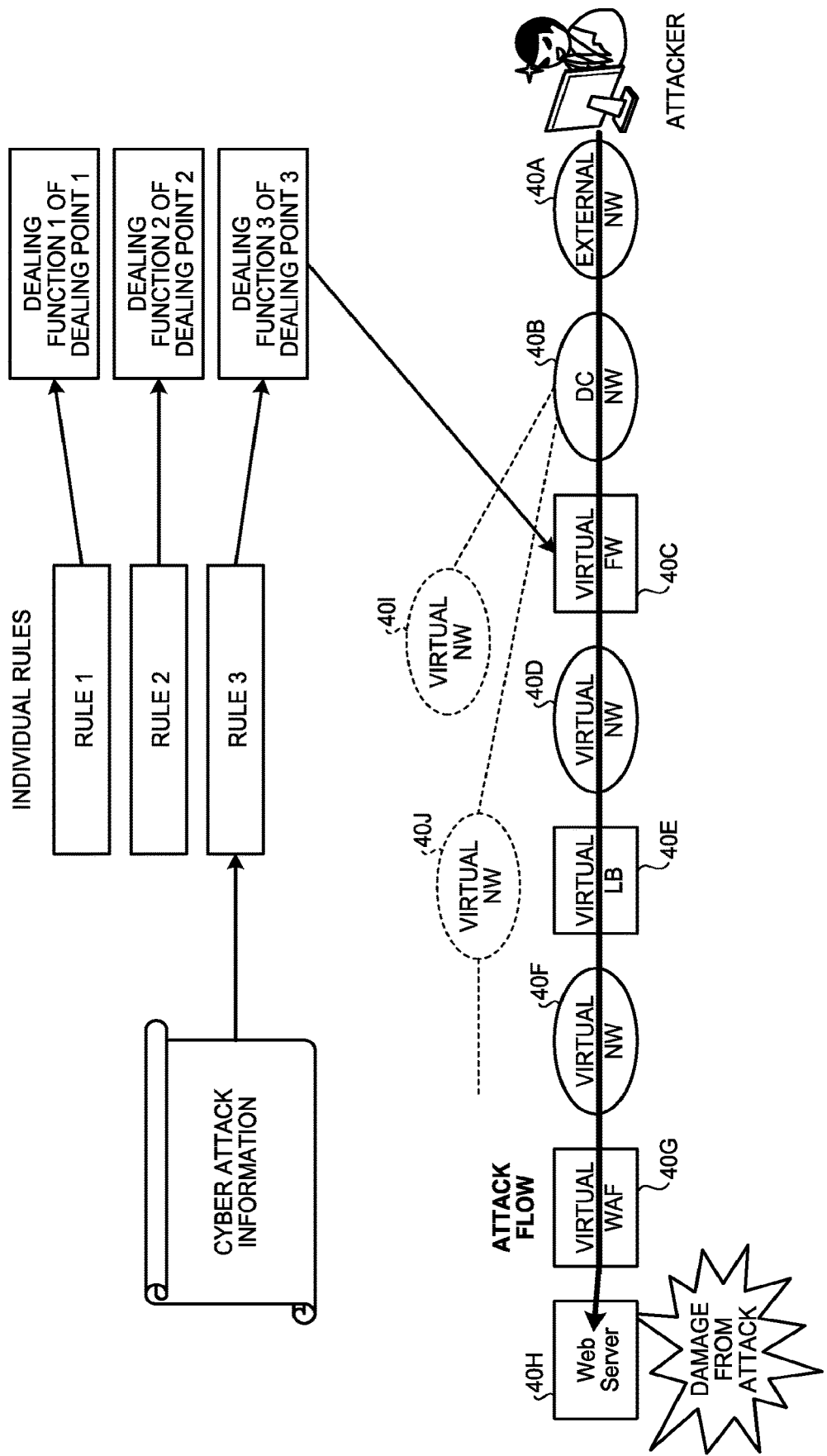

OPTIMIZATION APPARATUS, OPTIMIZATION METHOD, AND OPTIMIZATION PROGRAM

FIELD

The present invention relates to an optimization apparatus, an optimization method, and an optimization program.

BACKGROUND

Conventionally, in order to defend against cyber attacks, devices, such as firewalls and Web application firewalls (WAFs), have been statically provided, and defensive measures have been implemented at these points, based on preset rules, such as blacklists and signatures.

A conventional process, in which a dealing point is determined, will be described by used of FIG. 12. In an example of FIG. 12, an attacker is attacking a Web server 40H via an external network (NW) 40A, a data center (DC) NW 40B, a virtual firewall (FW) 40C, a virtual NW 40D, a virtual load balancer (LB) 40E, a virtual NW 40F, and a virtual WAF 40G. The DCNW 40B is connected to, not only the virtual FW 40C, but also a virtual NW 40I and a virtual NW 40J.

As exemplified by FIG. 12, for example, plural rules 1 to 3 have been defined as individual rules, which have been defined beforehand for attacks to be dealt with. If there is a cyber attack, the rule 3, which matches information related to the attacker, the victim, the type of attack, the effective dealing function, and the like (written as "cyber attack information" in FIG. 12), is identified. As a dealing point corresponding to the rule 3, a dealing point 3 is selected, and a dealing function of that dealing point is determined to be executed.

Further, as a technique for defending against cyber attacks by determination of dealing points against the cyber attacks, a technique has been known, in which a firewall near the attacker is searched for by attack traffic being traced, and defense against the attack is implemented upstream thereof. For example, a technique has been known, in which: as a first measure against occurrence of a denial of service (DOS) attack or the like, an attack is blocked by use of a dedicated FW at a detected location; and as a second measure, a dedicated FW near the attacker is searched for by traffic being traced, and the attack is blocked at a dealing point near the attacker upstream in the traffic (see for example, Non-Patent Literature 1).

As a method of defending against cyber attacks, a technique has been known, in which defense against cyber attacks is implemented by security policy in devices being dynamically changed and dynamic access control over Bayesian spam filters and ranges being executed (see, for example, Non-Patent Literature 2).

CITATION LIST

Non-Patent Literature

Non-Patent Literature 1: Eric Y. Chen, "AEGIS: An Active-Network-Powered Defense Mechanism against DDoS Attacks", IWAN '01 Proceedings of the IFIP-TC6 Third International Working Conference on Active Networks, Pages 1 to 15

Non-Patent Literature 2: W. Keith Edwards, Erika Shehan Poole, and Jennifer Stoll, "Security Automation Considered Harmful?", NSPW '07 Proceedings of the 2007 Workshop on New Security Paradigms, Pages 33 to 42

SUMMARY

Technical Problem

However, the above cited conventional techniques have had a problem that defense against cyber attacks by use of the optimum dealing functions at the optimum dealing points has sometimes been unable to be appropriately implemented since these techniques have been unable to deal with dynamic change in load states of the devices on the networks and in the network configurations.

For example, if many cyber attacks occur and implementation of security measures concentrates at a particular dealing point: resources of the targeted device, such as a central processing unit (CPU) and a memory, may be depleted; the dealing function may not operate; and defense against the cyber attacks may not be appropriately implemented.

Further, for example, since, when a network configuration is dynamically changed by dynamic addition of a virtual device, such as a virtual firewall, or the like, the addition of the new dealing point is not considered; change to the optimum dealing point may not be possible on the new network configuration.

In the above mentioned technique, in which the firewall near the attacker is searched for and the defense against the attack is implemented upstream: although a dealing point nearer to the attacker is able to be selected by the IP address of the attacker being traced; since only the dedicated devices are targeted, the optimum dealing point is unable to be dynamically selected for a network configuration formed of different types of security devices, such as a virtual firewall and an IPS. Further, similarly, the above mentioned technique, in which defense against the cyber attack is implemented by execution of dynamic access control, does not allow the optimum dealing point to be dynamically selected from plural security devices.

Solution to Problem

An optimization apparatus, includes: a collecting unit that collects cyber attack information that is information related to a cyber attack, and system information that is information related to an entire system including a device that has received the cyber attack; an extracting unit that identifies, based on the cyber attack information and the system information collected by the collecting unit, an attack route of the cyber attack, and extracts, as dealing point candidates, devices that are on the attack route and have an effective dealing function against the cyber attack; and a selecting unit that selects a dealing point from the dealing point candidates extracted by the extracting unit, by using optimization logic that has been set.

An optimization method executed by an optimization apparatus, the optimization method includes: a collecting process of collecting cyber attack information that is information related to a cyber attack, and system information that is information related to an entire system including a device that has received the cyber attack; an extracting process of identifying, based on the cyber attack information and the system information collected by the collecting process, an attack route of the cyber attack, and extracting, as dealing point candidates, devices that are on the attack route and have an effective dealing function against the cyber attack;

and a selecting process of selecting a dealing point from the dealing point candidates extracted by the extracting process, by using optimization logic that has been set.

An optimization program for causing a computer to execute: a collecting step of collecting cyber attack information that is information related to a cyber attack, and system information that is information related to an entire system including a device that has received the cyber attack; an extracting step of identifying, based on the cyber attack information and the system information collected by the collecting step, an attack route of the cyber attack, and extracting, as dealing point candidates, devices that are on the attack route and have an effective dealing function against the cyber attack; and a selecting step of selecting a dealing point from the dealing point candidates extracted by the extracting step, by using optimization logic that has been set.

Advantageous Effects of Invention

According to the present invention, an effect of being able to appropriately implement defense against cyber attacks by use of the optimum dealing function at the optimum dealing point, correspondingly to dynamic changes in load states of devices on the network and in the network configuration is achieved.

BRIEF DESCRIPTION OF DRAWINGS

FIG. 9 is a diagram illustrating a flow of a process, in which the optimization apparatus determines the optimum dealing point.

FIG. 10 is a flow chart illustrating a flow of a dealing point optimization process in the optimization apparatus according to the first embodiment.

FIG. 11 is a diagram illustrating a computer that executes an optimization program.

FIG. 12 is a diagram illustrating an example of a flow of a conventional process, in which a dealing point is determined.

DESCRIPTION OF EMBODIMENTS

Hereinafter, embodiments of an optimization apparatus, an optimization method, and an optimization program, according to the present application will be described in detail, based on the drawings. The optimization apparatus, the optimization method, and the optimization program, according to the present application are not limited by these embodiments.

First Embodiment

In the following embodiment, a configuration of a system, a configuration of an optimization apparatus, and a flow of a process by the optimization apparatus, according to a first embodiment, will be described in order, and lastly, effects according to the first embodiment will be described.

[Configuration of System]

Figure 1:
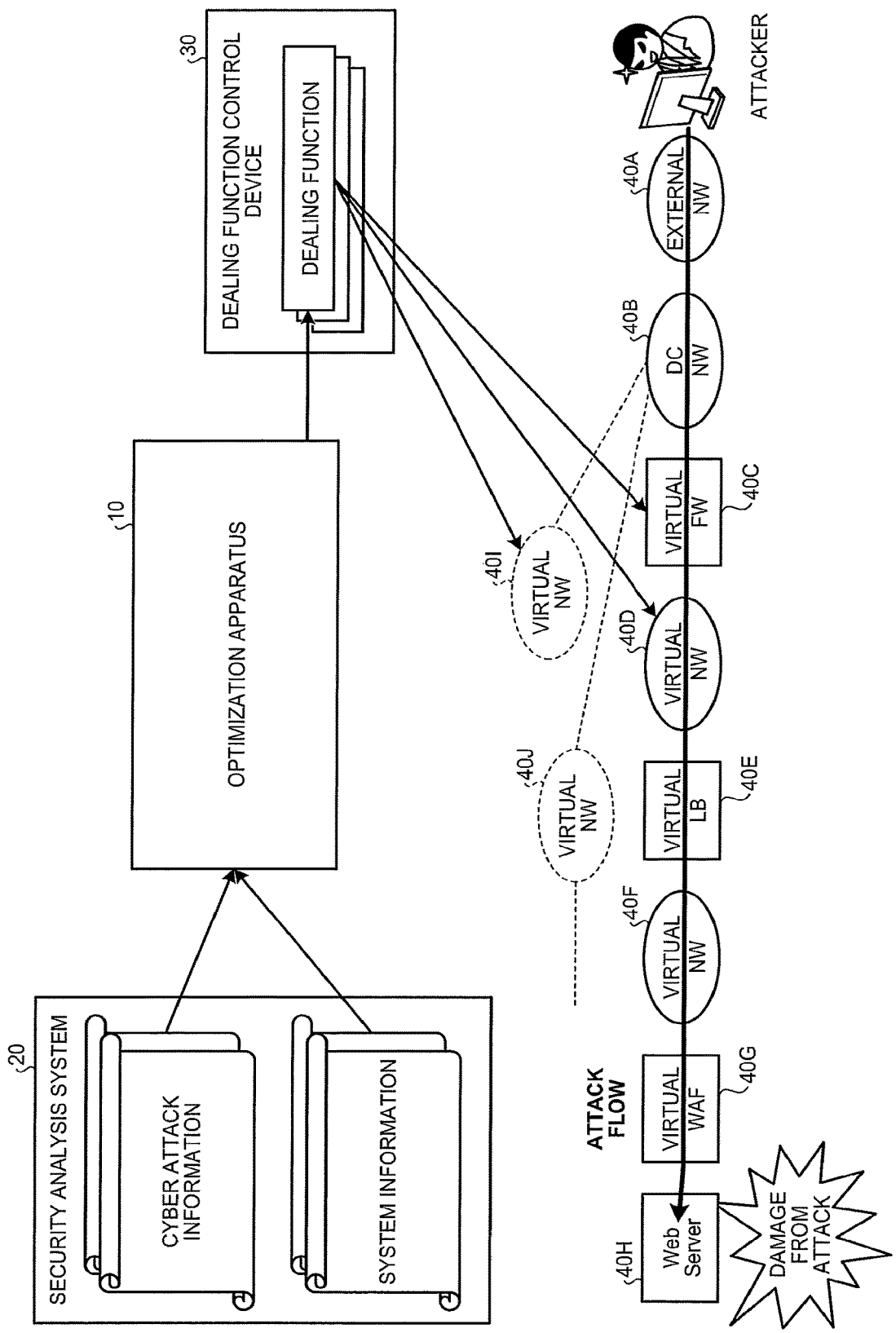
FIG. 1 is a diagram illustrating a configuration of a system including an optimization apparatus according to a first embodiment.

FIG. 1 is a diagram illustrating the configuration of the system including the optimization apparatus according to the first embodiment. The system illustrated in FIG. 1 has: an optimization apparatus 10; a security analysis system 20; a dealing function control device 30; devices and NWs that are on an attack route of a cyber attack (the external NW 40A, the DCNW 40B, the virtual FW 40C, the virtual NW 40D, the virtual LB 40E, the virtual NW 40F, and the virtual WAF 40G); and the Web server 40H that is receiving damage from the attack.

Further, in the example in FIG. 1, the attacker is attacking the Web server 40H via the external NW 40A, the DCNW 40B, the virtual FW 40C, the virtual NW 40D, the virtual LB 40E, the virtual NW 40F, and the virtual WAF 40G in order. The DCNW 40B is connected to, not only the virtual FW 40C, but also the virtual NW 40I and the virtual NW 40J.

The optimization apparatus 10 collects: cyber attack information, such as an attacker, a type of attack, and a dealing function; and system information, such as network configuration information and resource usage status information, and dynamically selects the optimum dealing point and dealing function by using optimization logic.

Specifically, the optimization apparatus 10 collects, from the security analysis system 20, the cyber attack information, which is information related to the cyber attack, and the system information, which is information related to the entire system including a device that has received the cyber attack. The collection of the cyber attack information and the system information from the security analysis system 20 may be triggered by the optimization apparatus 10 polling the security analysis system 20, or by the security analysis system 20 inputting to the optimization apparatus 10 through pushing. The cyber attack information and the system information may be not collected from the security analysis system 20, and results of determination by a human (a security operator) may be manually input as the cyber attack information and the system information, via a user interface.

Subsequently, based on the collected cyber attack information and system information, the optimization apparatus 10 identifies the attack route of the cyber attack, and extracts, as dealing point candidates, devices, which are on the attack route and have the effective dealing function against the cyber attack. From the extracted dealing point candidates, the optimization apparatus 10 selects a dealing point by using optimization logic that has been set. Thereafter, the optimization apparatus 10 outputs the selected dealing point and the effective dealing function, to the dealing function control device 30, and causes the dealing function control device 30 to execute the dealing function.

The security analysis system 20 is a system that executes security analysis, such as security information and event management (SIEM) analysis. For example, if there is a cyber attack, the security analysis system 20 manages, as the cyber attack information related to the cyber attack, information on the type of the cyber attack, an IP address that is an identifier of the attacker, an IP address that is an identifier of the victim, and the effective dealing function. Further, the security analysis system 20 manages, as the system information, network configuration information that is able to indicate a usage route for each service and security dealing points, dealing function information for each dealing point on the network, and resource usage status information of the dealing points. This managed system information is the latest system information, and whenever the system configuration or the like is changed, the system information is updated.

The dealing function control device 30 is notified by the optimization apparatus 10 of the dealing point caused to execute the dealing function, and by instructing the device that becomes the dealing point to execute the dealing function, controls the execution of the dealing function. In the example in FIG. 1, the virtual FW 40C, the virtual NW 40D, and the virtual NW 40I are instructed to execute the dealing function. As to the control of execution of dealing function, without the provision of the dealing function control device 30, the optimization apparatus 10 may directly instruct the device that becomes the dealing point to execute the dealing function.

[Configuration of Optimization Apparatus 10]

Figures 2, 3, 4:
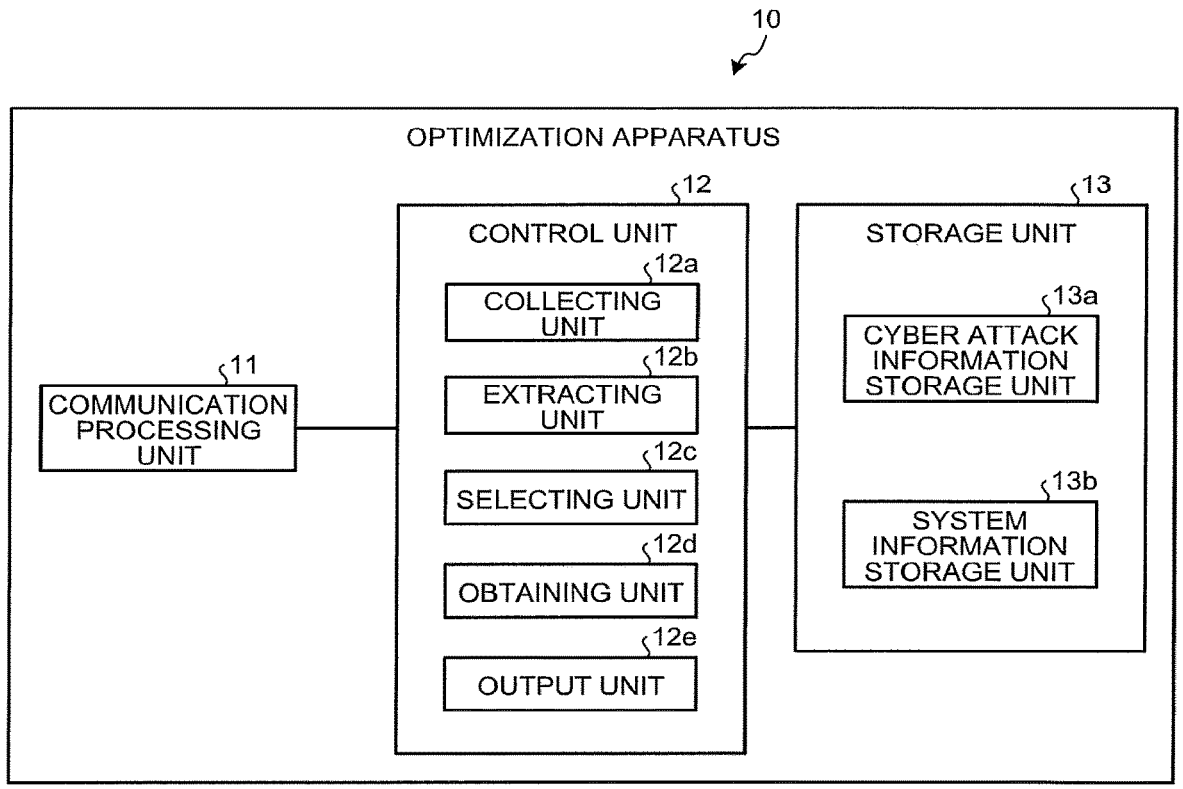
FIG. 2 is a block diagram illustrating a configuration of the optimization apparatus according to the first embodiment.
FIG. 3 is a diagram illustrating an example of a table stored in a cyber attack information storage unit.
FIG. 4 is a diagram illustrating an example of a table stored in a system information storage unit.

Next, a configuration of the optimization apparatus 10 illustrated in FIG. 1 will be described, by use of FIG. 2. FIG. 2 is a block diagram illustrating the configuration of the optimization apparatus 10 according to the first embodiment. As illustrated in FIG. 2, this optimization apparatus 10 has a communication processing unit 11, a control unit 12, and a storage unit 13. Hereinafter, processing of each of these units will be described.

The communication processing unit 11 controls communication related to various types of information exchanged with the security analysis system 20 and the dealing function control device 30. For example, the communication processing unit 11 receives the cyber attack information and the system information from the security analysis system 20. Further, for example, the communication processing unit 11 transmits information indicating the dealing point and the dealing function against the cyber attack, and the like, to the dealing function control device 30.

The storage unit 13 stores therein data and a program required in various types of processing by the control unit 12, and has, as those particularly closely related to the present invention, a cyber attack information storage unit 13a, and a system information storage unit 13b. For example, the storage unit 13 is: a semiconductor memory element, such as a random access memory (RAM) or a flash memory; or a storage device, such as a hard disk or an optical disk.

The cyber attack information storage unit 13a stores therein cyber attack information, which is information related to cyber attacks. For example, as illustrated in FIG. 3, the cyber attack information storage unit 13a stores therein, as the cyber attack information: "type of attack", which indicates types of the cyber attacks; "attacker IP address", which represents identifiers of terminals of attackers; "victim IP address", which represents identifiers of terminals of victims; and "effective dealing function", which represents effective dealing functions against the cyber attacks, in association with one another.

Specifically, in the example of FIG. 3, the cyber attack information storage unit 13a stores therein: a type of an attack, "DoS"; an attacker IP address, "A.A.A.A"; a victim IP address, "B.B.B.B"; and an effective dealing function, "layer 4 blockage", in association with one another.

The system information storage unit 13b stores therein system information, which is information related to the entire system including a device that has received a cyber attack. Specifically, the system information storage unit 13b stores therein network configuration information that is able to indicate a usage route for each service and dealing points, dealing function information indicating, for each dealing point, a dealing function that the dealing point has, and resource usage status information indicating resource usage statuses of the dealing points.

The system information storage unit 13b stores therein, as a specific example of the network configuration information, for example: "Internet→GW→FW→{VM1 (Web), VM2 (Web)}→VM3 (DB)"; and that "GW" and "FW" are the dealing points. Further, this example indicates that the VM1 and the VM2 to be protected are virtual machines operating in a Web layer and the VM3 is a virtual machine operating in a database (DB) layer.

Further, the system information storage unit 13b stores therein, for example, as illustrated in FIG. 4, as the system information, for each dealing point: "dealing point" indicating a device of the dealing point on the attack route; "dealing function" indicating a dealing function that the dealing point has; and "resource usage status information" indicating a resource usage status of the dealing point, in association with one another.

Specifically, in the example in FIG. 4, the system information storage unit 13b stores therein, in association with one another: a dealing point, "FW"; a dealing function, "layer 4 blockage"; and resource usage status information, "CPU usage rate: 10%". This means that the device, "FW", that is a dealing point, has "layer 4 blockage" as the dealing function, and the resource usage status where the CPU usage rate is "10%". In the example in FIG. 4, only information on the dealing point, "FW", is illustrated, but the system information storage unit 13b actually stores therein similar system information for devices that are the other dealing points. Further, the above described various data are just an example, and maybe arbitrarily modified. For example, the resource usage status information may be memory usage rates, instead of CPU usage rates.

The control unit 12 has an internal memory for storing therein: a program prescribing various procedural sequences; and necessary data, executes various types of processing by using them, and as those particularly closely related to the present invention, has, a collecting unit 12a, an extracting unit 12b, a selecting unit 12c, an obtaining unit 12d, and an output unit 12e.

The collecting unit 12a collects cyber attack information that is information related to a cyber attack, and system information that is information related to the entire system including a device that has received the cyber attack. The collecting unit 12a stores the collected cyber attack information in the cyber attack information storage unit 13a, and the system information in the system information storage unit 13b. The collecting unit 12a may collect the cyber attack information and the system information every time a cyber attack is detected on the system, or may periodically collect the cyber attack information and the system information at predetermined intervals. Further, the system information may be collected only when the system configuration or the like has been changed.

For example, the collecting unit 12a collects, as cyber attack information, "type of attack" indicating a type of a cyber attack, "attacker IP address" being an identifier of the terminal of the attacker, "victim IP address" being an identifier of the terminal of the victim, and "effective dealing function" indicating an effective dealing function against the cyber attack, from the security analysis system 20. Further, for example, the collecting unit 12a collects, as system information, "network configuration information" that is able to indicate a usage route for each service and security dealing points, "dealing function information" for each dealing point on the network, and "resource usage status information" of the dealing points, from the security analysis system 20.

Based on the collected cyber attack information and system information collected by the collecting unit 12a, the extracting unit 12b identifies the attack route of the cyber attack, and extracts, as dealing point candidates, devices, which are on the attack route and have the effective dealing function against the cyber attack.

For example, the extracting unit 12b associates the attacker IP address, the victim IP address, and the type of attack, which have been collected by the collecting unit 12a, with the network configuration information; identifies the attack route of the cyber attack; extracts dealing points on the attack route; collates the dealing function information for the respective dealing points with the effective dealing function against the cyber attack; and extracts any device having the effective dealing function against the cyber attack as a dealing point candidate.

After a process of identifying the attack route, in which, for example, based on the network configuration information collected by the collecting unit 12a, the network configuration information being able to indicate the usage route for each service and the security dealing points, the extracting unit 12b searches for the collected attacker IP address and victim IP address, and identifies a route from the terminal of the attacker to the terminal of the victim as the attack route; the extracting unit 12b extracts any communication device or security device that is a dealing point, through which the attack route from the terminal of the attacker to the terminal of the victim passes, as a dealing point.

By use of an example in FIG. 5, the process, in which an attack route of a cyber attack is identified, will be described. For example, the extracting unit 12b maps the cyber attack information (the attacker IP address, the victim IP address, and the type of attack) onto graph information being the network configuration information, analyzes an attack route, and extracts dealing points on the attack route.

Figure 5:
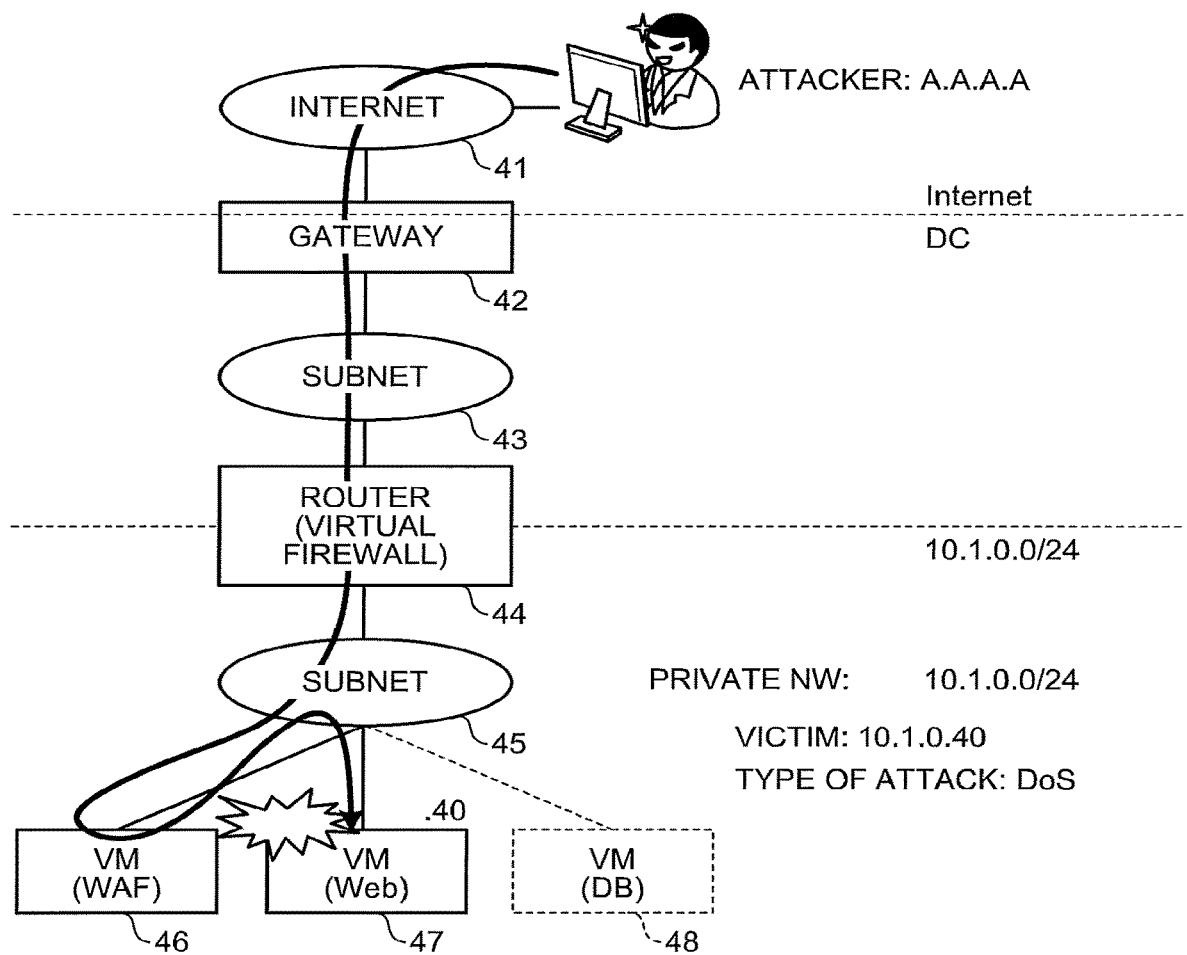
FIG. 5 is a diagram illustrating a process, in which an attack route of a cyber attack is identified.

That is, in the example in FIG. 5, graph information indicating a service usage route, "Internet 41→gateway 42→subnet 43→router (virtual firewall) 44→subnet 45→VM (WAF) 46→VM (Web) 47→VM (DB) 48", is used. For this, nodes of the collected attacker IP address, "A.A.A.A", and victim IP address, "10.1.0.40", are searched for; and a route, "Internet 41→gateway 42→subnet 43→router (virtual firewall) 44→subnet 45→VM (WAF) 46→VM (Web) 47", getting to the victim node from the attacker node on the graph according to the service usage route, is identified.

In the example in FIG. 5, the extracting unit 12b extracts, as the dealing points that the attack route passes through, "subnet 43", "router (virtual firewall) 44", "subnet 45", and "VM (WAF) 46". In the example in FIG. 5, the Internet 41 and the gateway 42 are not dealing points.

Thereafter, for the extracted dealing points, the extracting unit 12b compares the collected dealing functions of each dealing point on the network with information on the effective dealing function required for the cyber attack, and identifies, as a dealing point candidate, any dealing point that has the dealing function effective for that cyber attack.

Figure 6:
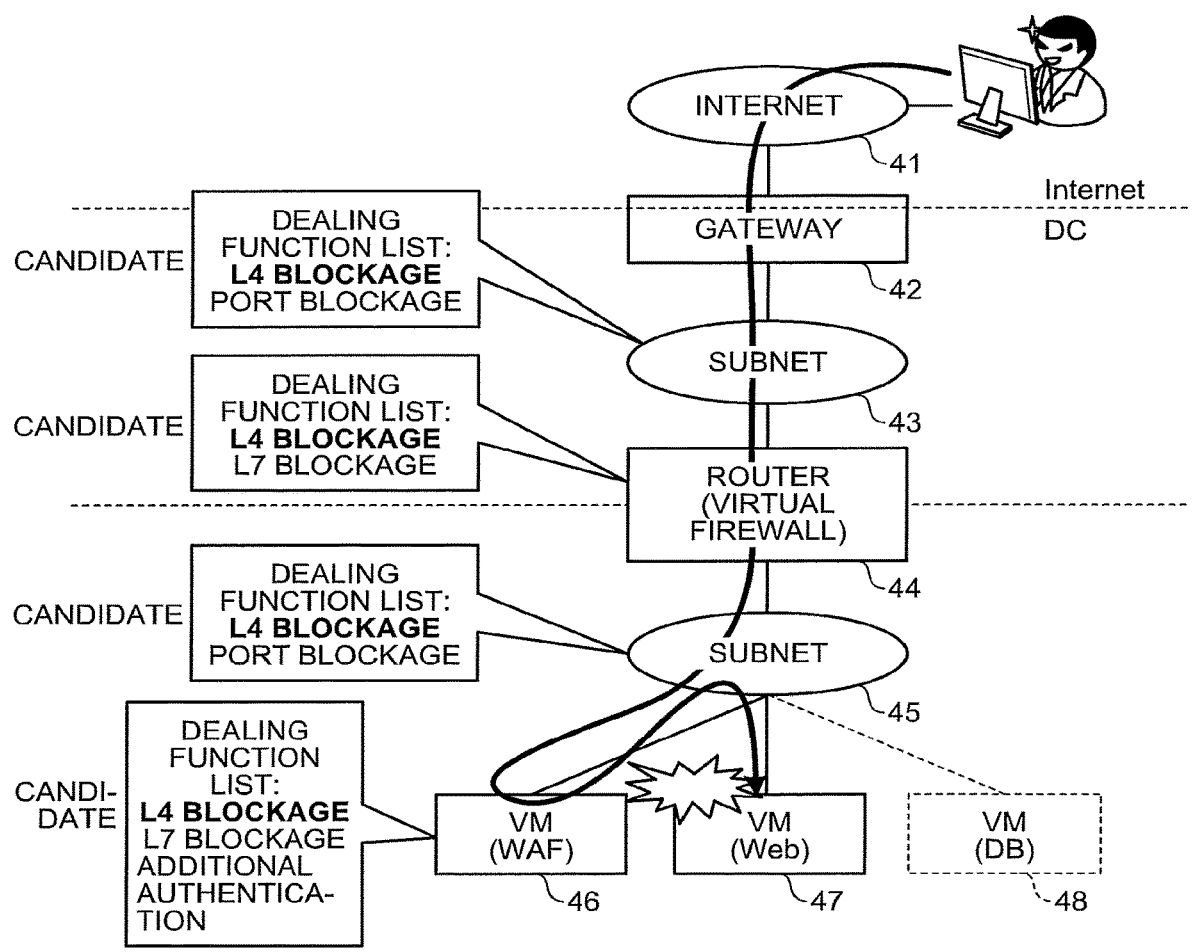
FIG. 6 is a diagram illustrating a process, in which dealing point candidates are extracted.

By use of an example in FIG. 6, a process, in which a dealing point candidate is extracted, will be described. FIG. 6 is a diagram illustrating the process, in which a dealing point candidate is extracted. In the example in FIG. 6, the effective dealing function for the cyber attack information is "layer 4 (L4) blockage". As exemplified by FIG. 6, by reference to the dealing functions of each dealing point stored in the system information storage unit 13b, it is understood that, of the dealing points: the subnet 43 has the dealing functions, "L4 blockage" and "port blockage"; the router (virtual firewall) 44 has the dealing functions, "L4 blockage" and "L7 blockage"; the subnet 45 has the dealing functions, "L4 blockage" and "port blockage"; and the VM (WAF) 46 has the dealing functions, "L4 blockage", "L7 blockage", and "additional authentication".

By the extracting unit 12b comparing the effective dealing function against the cyber attack stored in the cyber attack information storage unit 13a with the dealing functions that each dealing point has, the dealing functions being stored in the system information storage unit 13b, it is determined that all of the dealing points, "subnet 43", "router (virtual firewall) 44", "subnet 45", and "VM (WAF) 46" have the dealing function, "L4 blockage", and all of "subnet 43", "router (virtual firewall) 44", "subnet 45", and "VM (WAF) 46" are extracted as dealing point candidates.

From the dealing point candidates extracted by the extracting unit 12b, the selecting unit 12c selects a dealing point by using optimization logic that has been set. Specifically, the selecting unit 12c selects a dealing point by using optimization logic for selecting a dealing point nearest to the terminal of the attacker that is the initiating point of the cyber attack, or optimization logic for selecting a dealing point with the lowest resource usage rate. As to the optimization logic, optimization logic to be used may be set beforehand, or optimization logic to be used may be selected and set dynamically according to the type of the attack or the like.

That is, as the optimization logic, a dealing point with the most vacant resources in terms of resources may be selected by determination of a resource usage rate for each dealing point, or a dealing point that is nearest to the attacker may be selected by determination of a location of each dealing point. Which of these two types of optimization logic is to be used may be selected. Further, the optimization logic may be automatically selected according to the type of the attack, or a dealing point may be selected by comprehensive determination of both the distance from the attacker and the resource usage rate.

For example, for the dealing point candidates extracted by the extracting unit 12b, by using optimization logic for selecting a dealing point nearest to the terminal of the attacker that is the initiating point of the cyber attack, the selecting unit 12c refers to the attack route, analyzes the distance from the terminal of the attacker on the network for each dealing point candidate, and selects, from the dealing point candidates, a dealing point with the shortest distance.

Figure 7:
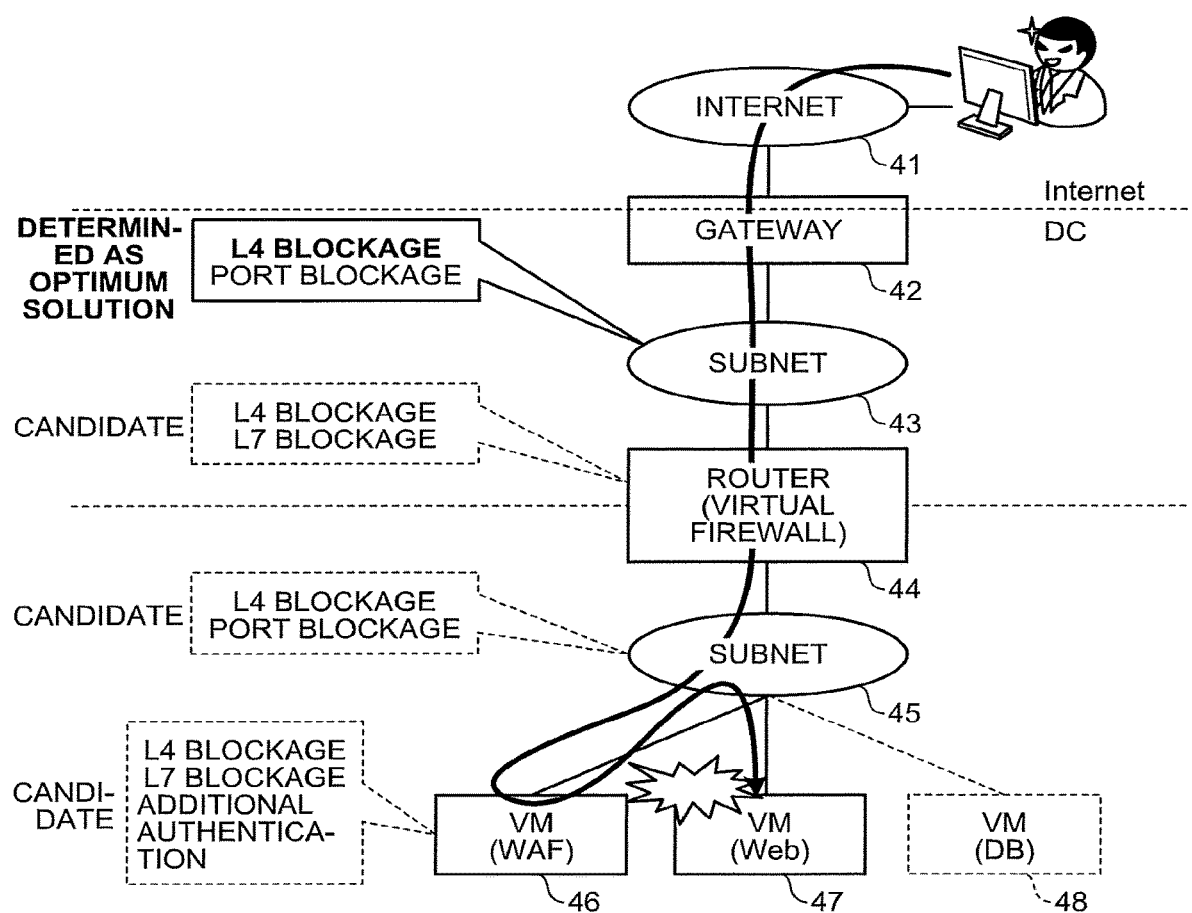
FIG. 7 is a diagram illustrating a process, in which a dealing point is selected from the dealing point candidates, by use of optimization logic.

By use of an example in FIG. 7, a process, in which a dealing point is selected from dealing point candidates by use of optimization logic, will be described. FIG. 7 is a diagram illustrating the process, in which a dealing point is selected from dealing point candidates by use of optimization logic. As illustrated in FIG. 7, by using the optimization logic for selecting a dealing point nearest to the terminal of the attacker that is the initiating point of the cyber attack, the selecting unit 12c refers to the attack route, analyzes respective distances from the terminal of the attacker on the network of four points, "subnet 43", "router (virtual firewall)

44", "subnet 45", and "VM (WAF) 46", and selects "subnet 43" having the shortest distance from the attacker, from the dealing point candidates. When the subnet 43 executes the dealing function, such as "L4 blockage"; practically, a virtual switch or the like included in the subnet 43 executes the dealing function.

Further, for example, for the dealing point candidates extracted by the extracting unit 12b, by using the optimization logic for selecting a dealing point with the lowest resource usage rate, the selecting unit 12c refers to the resource usage status information for each dealing point candidate and selects a dealing point with the lowest resource usage rate, from the dealing point candidates.

The obtaining unit 12d obtains a parameter required for the dealing point selected by the selecting unit 12c to execute the dealing function. The output unit 12e outputs the parameter obtained by the obtaining unit 12d, together with the information indicating the dealing point selected by the selecting unit 12c and the effective dealing function, to the external dealing function control device 30.

Figure 8:
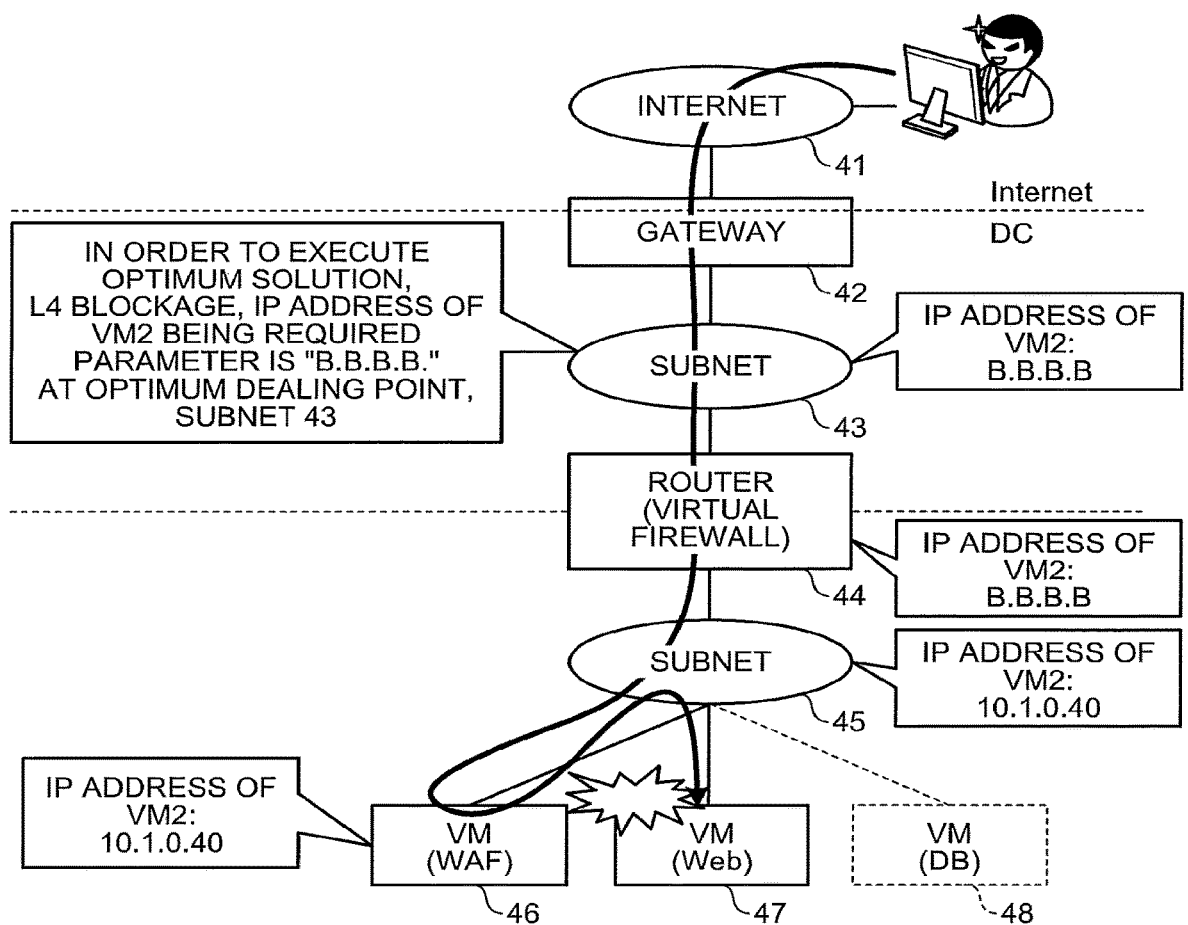
FIG. 8 is a diagram illustrating a process, in which a parameter required for a dealing function at the dealing point to be executed is obtained.

By use of FIG. 8, a process, in which a parameter required for a dealing function at a dealing point to be executed is obtained, will be described. FIG. 8 is a diagram illustrating the process, in which a parameter required for a dealing function at a dealing point to be executed is obtained. For example, due to a reason, such as network address translation (NAT), the detected victim IP address may be different from the victim IP address for control at the dealing point. In the example in FIG. 8, the detected victim IP address is "10.1.0.40", and the IP address that is the parameter for control at the dealing point is "B.B.B.B". With respect to this difference between the IP addresses, for each dealing point, the ID of the VM to be protected (for example, in the example in FIG. 8, the VM name, "VM2" of the VM 47) is regarded as a unified search key. Each dealing point is caused to hold the IP address for when the dealing point executes control over the VM 47.

In the example in FIG. 8, for example, if the subnet 43 is selected as the dealing point, the obtaining unit 12d obtains the IP address, "B.B.B.B", of the VM 47 at the subnet 43. The output unit 12e then outputs, as the necessary parameter, the IP address, "B.B.B.B", of the VM 47, to the dealing function control device 30, such that a virtual switch or the like of the subnet 43 is able to execute L4 blockage.

Next, by use of FIG. 9, a flow of a process, in which the optimization apparatus 10 determines the optimum dealing point, will be described. FIG. 9 is a diagram illustrating the flow of the process, in which the optimization apparatus determines the optimum dealing point. As illustrated in FIG. 9, the optimization apparatus 10 extracts dealing points on the attack route, from the cyber attack information and the system information (see (1) in FIG. 9). In the example in FIG. 9, the virtual FW 40C, the virtual NW 40D, the virtual NW 40F, and the virtual WAF 40G are extracted as dealing points.

Subsequently, the optimization apparatus 10 narrows down the extracted dealing points to dealing point candidates having the effective dealing function (see (2) in FIG. 9). In the example in FIG. 9, since all of the virtual FW 40C, the virtual NW 40D, the virtual NW 40F, and the virtual WAF 40G have the effective dealing function, "L4 blockage", all of the virtual FW 40C, the virtual NW 40D, the virtual NW 40F, and the virtual WAF 40G are the dealing point candidates.

The optimization apparatus 10 then selects the optimum solution from the dealing point candidates by using optimization logic (see (3) in FIG. 9). For example, as exemplified by FIG. 9, by using the optimization logic for selecting a dealing point nearest to the terminal of the attacker that is the initiating point of the cyber attack, the optimization apparatus 10 selects the virtual FW 40C as the dealing point nearest to the attacker, and causes the virtual FW 40C to be able to execute L4 blockage.

As described above, the optimization apparatus 10 achieves an effect of being able to implement defense against a cyber attack by using the optimum dealing function at the optimum point, such as the point nearest to the attacker or the point with a low network or node load by: collecting the cyber attack information, such as the attacker, the type of attack, and the dealing function, and the system information, such as the network configuration information and the resource usage status information; using the optimization logic; and dynamically identifying the optimum dealing point and dealing function.

That is, the optimization apparatus 10 is able to determine the optimum solution from dealing candidates in terms of diverse optimization and realize appropriate and efficient security measures, by for example, analyzing the latest topology information per cyber attack and extracting dealing point candidates having the effective dealing function against the attack that has occurred.

Example of Process by Optimization Apparatus

Next, by use of FIG. 10, a process by the optimization apparatus 10 will be described. FIG. 10 is a flow chart illustrating a flow of a dealing point optimization process in the optimization apparatus according to the first embodiment.

As illustrated in FIG. 10, the collecting unit 12a of the optimization apparatus 10 collects the cyber attack information and the system information from the security analysis system 20, if, for example, there is a cyber attack on the system (Step S101). The extracting unit 12b of the optimization apparatus 10 maps the cyber attack information (the attacker IP address, the victim IP address, and the type of attack) onto the system information, analyzes the attack route, and extracts dealing points on the attack route (Step S102).

Subsequently, the extracting unit 12b of the optimization apparatus 10 collates, for each of the dealing points, its executable dealing functions with the required effective dealing function, and extracts dealing point candidates (Step S103). By using the optimization logic, the selecting unit 12c of the optimization apparatus 10 selects the optimum dealing point and dealing function (Step S104). For example, the selecting unit 12c selects the dealing point by using the optimization logic for selecting a dealing point nearest to the terminal of the attacker that is the initiating point of the cyber attack, or the optimization logic for selecting a dealing point with the lowest resource usage rate.

Thereafter, the output unit 12e of the optimization apparatus 10 outputs the optimum dealing point and dealing function to the external dealing function control device 30 (Step S105). For example, the output unit 12e outputs a parameter obtained by the obtaining unit 12d, together with information indicating the dealing point selected by the selecting unit 12c and the effective dealing function, to outside.

Effects of First Embodiment

As described above, the optimization apparatus 10 of the system according to the first embodiment collects cyber attack information that is information related to a cyber attack, and system information that is information related to an entire system including a device that has received the cyber attack. Based on the collected cyber attack information and system information, the optimization apparatus 10 identifies an attack route of the cyber attack, and extracts, as dealing point candidates, devices, which are on the attack route and have an effective dealing function against the cyber attack. Subsequently, from the extracted dealing point candidates, the optimization apparatus 10 selects a dealing point by using optimization logic that has been set. Thereby, correspondingly to dynamic change in load states of the devices on the network and in the network configuration, defense against the cyber attack is able to be implemented by use of the optimum dealing function at the optimum dealing point.

That is, the optimization apparatus 10 achieves an effect of being able to implement defense against a cyber attack by using the optimum dealing function at the optimum point, such as the point nearest to the attacker or the point with a low network or node load, by: collecting the cyber attack information, such as the attacker, the type of attack, and the dealing function, and the system information, such as the network configuration information and the resource usage status information; using the optimization logic; and dynamically identifying the optimum dealing point and dealing function. For example, the optimization apparatus 10 is able to determine the optimum solution from dealing candidates in terms of diverse optimization and realize appropriate and efficient security measures, by analyzing the latest topology information per cyber attack and extracting dealing point candidates having the effective dealing function against the attack that has occurred.

[System Configuration]

Further, each component of the respective devices is functionally and conceptionally illustrated, and is not necessarily physically configured as illustrated in the drawings. That is, specific modes of distribution and integration of the respective devices are not limited to those illustrated in the drawings, and depending on various loads and use situations, all or a part of the devices may be configured to be functionally or physically distributed or integrated in arbitrary units. Furthermore, all or any part of the processing functions executed by the respective devices may be realized by a CPU and a program analyzed and executed by the CPU, or may be implemented as hardware by wired logic. For example, the collecting unit 12*a* and the extracting unit 12*b* may be integrated with each other.

Further, of the respective processes described in the embodiment, all or a part of any process described as being executed automatically may be executed manually, or all or a part of any process described as being executed manually may be executed automatically by a known method. In addition, the procedural sequences, control sequences, specific names, and information including various data and parameters described above and illustrated in the drawings may be arbitrarily modified unless otherwise particularly stated.

[Program]

Further, a program, which describes the processing executed by the optimization apparatus 10 according to the above described embodiment in a language executable by a computer, may be generated. In this case, by the computer executing the program, effects that are the same as those of the above described embodiment are able to be obtained. Moreover, by recording that program in a computer readable recording medium and causing the computer to load and execute the program recorded in this recording medium, processing that is the same as that of the above described embodiment may be realized. Hereinafter, an example of a computer, which executes an optimization program that realizes functions that are the same as those of the optimization apparatus 10, will be described.

FIG. 11 is a diagram illustrating the computer that executes the optimization program. As illustrated in FIG. 11, a computer 1000 has, for example, a memory 1010, a CPU 1020, a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011, and a RAM 1012. The ROM 1011 stores therein a boot program, such as Basic Input Output System (BIOS), for example. The hard disk drive interface 1030 is connected to a hard disk drive 1090. The disk drive interface 1040 is connected to a disk drive 1041. An attachable and detachable storage medium, such as a magnetic disk or an optical disk, for example, is inserted in the disk drive 1041. A mouse 1110 and a keyboard 1120, for example, are connected to the serial port interface 1050. A display 1130, for example, is connected to the video adapter 1060.

As illustrated in FIG. 11, the hard disk drive 1090 stores therein, for example, an OS 1091, an application program 1092, a program module 1093, and program data 1094. Each table described in the above embodiment is stored in, for example, the hard disk drive 1090, or the memory 1010.

Further, the optimization program is, for example, stored in the hard disk drive 1090, as the program module 1093, in which commands executed by the computer 1000 are described. Specifically, the program module 1093, in which each of the processes executed by the optimization apparatus 10 described in the embodiment above is described, is stored in the hard disk drive 1090.

Further, data used in information processing by the optimization program are stored as the program data 1094 in, for example, the hard disk drive 1090. The CPU 1020 loads the program module 1093 and the program data 1094 stored in the hard disk drive 1090 as necessary into the RAM 1012 and executes the above described sequences.

The program module 1093 and the program data 1094 related to the optimization program are not necessarily stored in the hard disk drive 1090, and for example, may be stored in an attachable and detachable storage medium and read out by the CPU 1020 via the disk drive 1041 or the like. Or, the program module 1093 and the program data 1094 related to the optimization program may be stored in another computer connected via a network, such as a local area network (LAN) or a wide area network (WAN), and read out by the CPU 1020 via the network interface 1070.

REFERENCE SIGNS LIST

10 OPTIMIZATION APPARATUS
11 COMMUNICATION PROCESSING UNIT
12 CONTROL UNIT
12*a* COLLECTING UNIT
12*b* EXTRACTING UNIT
12*c* SELECTING UNIT
12*d* OBTAINING UNIT
12*e* OUTPUT UNIT
13 STORAGE UNIT
13*a* CYBER ATTACK INFORMATION STORAGE UNIT
13*b* SYSTEM INFORMATION STORAGE UNIT

20 SECURITY ANALYSIS SYSTEM
30 DEALING FUNCTION CONTROL DEVICE

The invention claimed is:

1. An optimization apparatus, comprising:
   circuitry configured to
   collect cyber attack information that is information related to a cyber attack, and system information that is information related to an entire system including a device that has received the cyber attack, the cyber attack information including information identifying which of a plurality of dealing functions is an effective dealing function against the cyber attack, the system information including resource usage status information indicating resource usage statuses of dealing points, which are devices that are on an attack route of the cyber attack;
   identify, based on the cyber attack information and the system information, the attack route of the cyber attack, and extract, as dealing point candidates among the dealing points, devices that are on the attack route and have the effective dealing function against the cyber attack; and
   select a dealing point from the extracted dealing point candidates, by using optimization logic that has been set for selecting a dealing point based at least partly on a lowest resource usage rate such that the circuitry is configured to refer to the resource usage status information, and select, from the dealing point candidates, a dealing point with the lowest resource usage rate.

2. The optimization apparatus according to claim 1, wherein the circuitry is configured to: collect, as the cyber attack information, attack type information indicating a type of the cyber attack, an attacker identifier that identifies a terminal of an attacker, a victim identifier that identifies a terminal of a victim, and dealing function information indicating the effective dealing function against the cyber attack; and collect, as the system information, network configuration information that is able to indicate a usage route for each service and devices that may become dealing point candidates, dealing function information for each of the dealing points.

3. The optimization apparatus according to claim 2, wherein the circuitry is configured to associate the attacker identifier, the victim identifier, and the attack type information, which have been collected, with the network configuration information; identify the attack route of the cyber attack; extract the dealing points on the attack route; collate the dealing function information for each of the dealing points with the effective dealing function against the cyber attack; and extract devices having the effective dealing function against the cyber attack as the dealing point candidates.

4. The optimization apparatus according to claim 1, wherein for the extracted dealing point candidates, by using optimization logic for selecting a dealing point nearest to a terminal of an attacker, the terminal being an initiating point of the cyber attack, the circuitry is configured to refer to the attack route, analyze an on-network distance of each of the dealing point candidates from the terminal of the attacker, and select, from the dealing point candidates, a dealing point with the shortest distance.

5. The optimization apparatus according to claim 1, wherein the circuitry is further configured to:
   obtain a parameter required for the dealing point selected to execute the dealing function; and
   output the obtained parameter to outside, together with information indicating the selected dealing point and the effective dealing function.

6. The optimization apparatus according to claim 1, wherein the plurality of dealing functions includes at least one of a method of performing blockage at specific network layer and performing blockage of a specific port.

7. The optimization apparatus according to claim 1, wherein the resource usage rate is a usage of at least one of a processor and memory of a respective dealing point.

8. An optimization method executed by an optimization apparatus, the optimization method including:
   a collecting process of collecting cyber attack information that is information related to a cyber attack, and system information that is information related to an entire system including a device that has received the cyber attack, the cyber attack information including information identifying which of a plurality of dealing functions is an effective dealing function against the cyber attack, the system information including resource usage status information indicating resource usage statuses of dealing points, which are devices that are on an attack route of the cyber attack;
   an extracting process of identifying, based on the cyber attack information and the system information collected by the collecting process, the attack route of the cyber attack, and extract, as dealing point candidates among the dealing points, devices that are on the attack route and have the effective dealing function against the cyber attack; and
   a selecting process of selecting a dealing point from the dealing point candidates extracted by the extracting process, by using optimization logic that has been set for selecting a dealing point based at least partly on a lowest resource usage rate such that the method includes referring to the resource usage status information, and selecting, from the dealing point candidates, a dealing point with the lowest resource usage rate.

9. A non-transitory computer-readable recording medium having stored an optimization program for causing a computer to execute a process comprising:
   a collecting step of collecting cyber attack information that is information related to a cyber attack, and system information that is information related to an entire system including a device that has received the cyber attack, the cyber attack information including information identifying which of a plurality of dealing functions is an effective dealing function against the cyber attack, the system information including resource usage status information indicating resource usage statuses of dealing points, which are devices that are on an attack route of the cyber attack;
   an extracting step of identifying, based on the cyber attack information and the system information collected by the collecting step, the attack route of the cyber attack, and extract, as dealing point candidates among the dealing points, devices that are on the attack route and have the effective dealing function against the cyber attack; and
   a selecting step of selecting a dealing point from the dealing point candidates extracted by the extracting step, by using optimization logic that has been set for selecting a dealing point based at least partly on a lowest resource usage rate such that the method includes referring to the resource usage status information, and selecting, from the dealing point candidates, a dealing point with the lowest resource usage rate.

* * * * *